UNITED STATES PATENT OFFICE.

MARION D. FLEMING, OF BUTTE, MONTANA.

COMPOSITION FOR PROTECTION OF METALLIC SURFACES FROM CORROSION.

SPECIFICATION forming part of Letters Patent No. 550,714, dated December 3, 1895.

Application filed January 2, 1895. Serial No. 533,617. (No specimens.)

*To all whom it may concern:*

Be it known that I, MARION D. FLEMING, of Butte, in the county of Silver Bow and State of Montana, have invented a new and useful Improvement in Anticorrosive Paint, of which the following is a specification.

My invention is in the nature of a new and useful composition of matter for the protection of metallic substances from corrosion by mineral waters or air contaminated with corrosive impurities.

Copper mines have considerable trouble in pumping the water through the iron pipes, as the action of the water (being acid by reason of the sulphate of copper in solution) tends to corrode the pipes and soon destroys them, and consequently the mines are obliged to employ either brass or copper pipes, which are very expensive.

My composition is designed chiefly as a coating for the iron pipes and the engines and pumps which are subject to injury from the action of the water, and in thoroughly protecting the same it perfectly accomplishes the object for which it was intended.

My invention is also applicable to and designed for the protection of gas, water, and sewer pipes from the corrosive influence of electrical currents when embedded in moist earth, and also for the protection of metals from the corrosive action of sea-water or air laden with corrosive impurities.

My composition consists of the following ingredients in the proportions stated, viz: powdered silica, three ounces, troy; powdered plumbago, three ounces, troy; powdered litharge, eight ounces, troy; powdered asbestos, three onces, troy; liquid shellac, seventy-two ounces, fluid, the liquid shellac to be made by dissolving orange shellac in alcohol in the proportion of three ounces of shellac to six and one-half ounces alcohol. Having thoroughly mixed the other ingredients, they are added to the liquid shellac, stirring constantly until thoroughly and evenly mixed.

The composition is to be applied by a brush, allowing first coat to dry before applying second. The metal to be protected should first be freed from all grease or oils.

By the use of the above composition metallic substances can be protected from the corrosive action of mineral water or air containing corrosive impurities in a most efficient manner and at a very small expense.

Having thus described my invention, what I claim as new, and desire to secure by Letters Patent, is—

The herein described composition of matter for protecting metallic substances from corrosion consisting of silica, plumbago, litharge, asbestos, shellac and alcohol in or about the proportions specified.

MARION D. FLEMING.

Witnesses:
L. P. FORESTELL,
W. J. BAKER.